United States Patent [19]

Kline

[11] 4,100,568
[45] Jul. 11, 1978

[54] COLOR TELEVISION ENCODER SIGNALS

[75] Inventor: Donald D. Kline, Palo Alto, Calif.

[73] Assignee: Commercial Electronics, Inc., Mountain View, Calif.

[21] Appl. No.: 683,347

[22] Filed: May 5, 1976

[51] Int. Cl.² ............................................... H04N 9/02
[52] U.S. Cl. ..................................................... 358/21
[58] Field of Search .................... 358/12, 14, 21, 37, 358/38, 23

[56] References Cited

U.S. PATENT DOCUMENTS

| 3,317,661 | 5/1967 | Dischert et al. | 358/23 |
| 3,728,476 | 4/1973 | Bates et al. | 358/38 X |
| 3,969,761 | 7/1976 | Favreau | 358/14 |
| 3,969,762 | 7/1976 | Favreau | 358/14 X |

OTHER PUBLICATIONS

Roizen and Lipkin, "SECAM: An End to Crosstalk," Electronics, Mar. 22, 1965, pp. 104–105.

*Primary Examiner*—Richard Murray
*Attorney, Agent, or Firm*—Townsend and Townsend

[57] ABSTRACT

Color television chrominance signal encoding is improved by alternately keying parallel modulators controlled by independent oscillators. Improved luminance signal encoding minimizing crosstalk is achieved by selected filtering, delay and threshold control in response to repetitive high signal level conditions. Circuitry for improving luminance signal encoding is described which is useful in both fm and am video signal processing applications. A preferred embodiment of an encoder is described which is operative according to the French SECAM standard.

22 Claims, 30 Drawing Figures

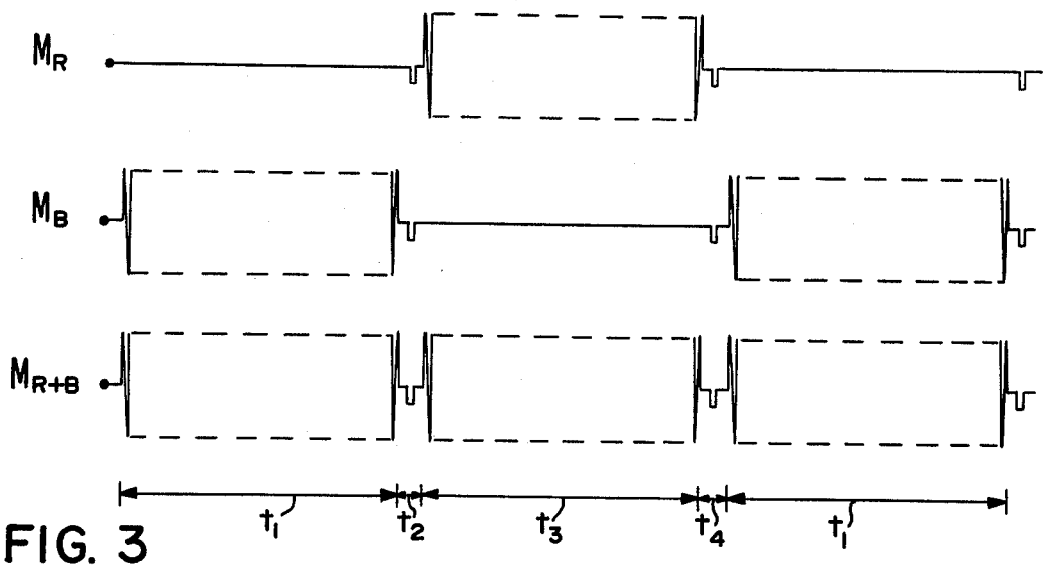
FIG. 3
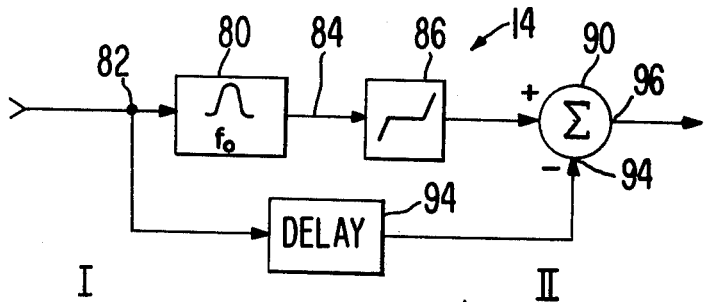
FIG. 4
FIG. 5A
JUNCTION 82
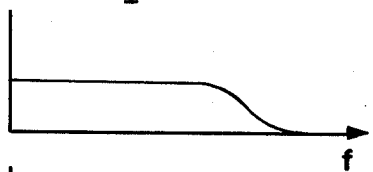
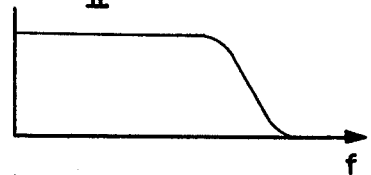
FIG. 5B
SIGNAL PATH 84
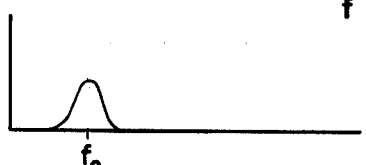
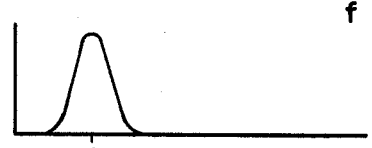
FIG. 5C
SUMMING INPUT 94
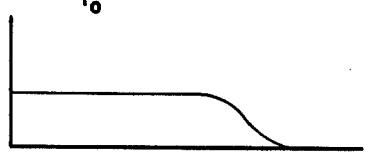
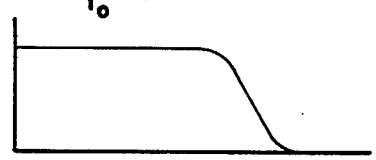
FIG. 5D
SUMMING INPUT 88
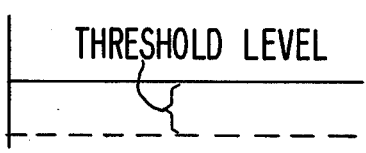
FIG. 5E
OUTPUT TERMINAL 96
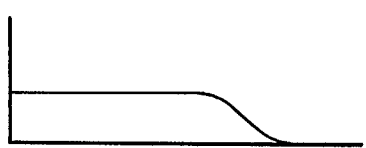
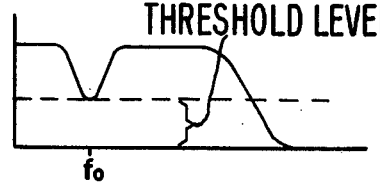

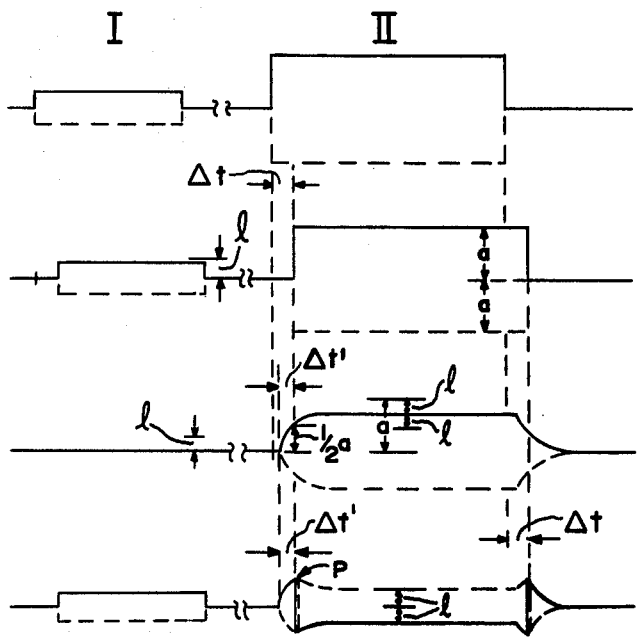
FIG. 6A
LUMINANCE
INPUT 82
FIG. 6B
SUMMING
JUNCTION 94
FIG. 6C
SUMMING
JUNCTION 88
FIG. 6D
OUTPUT
TERMINAL 96
FIG. 6E
WIDEBAND
LUMINANCE RESPONSE
FIG. 6F
RECEIVER
CHROMINANCE CHANNEL
FIG. 6G
ENCODER
CHROMINANCE OUTPUT
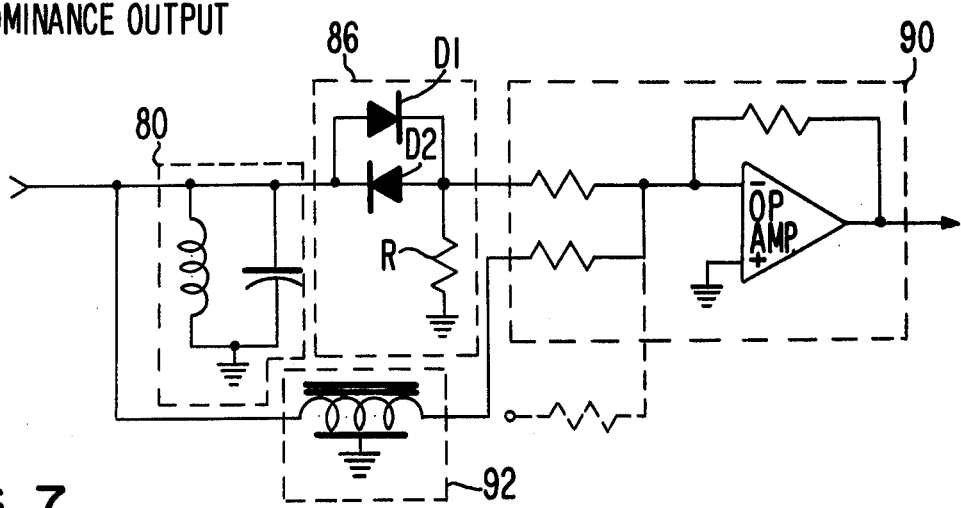
FIG. 7

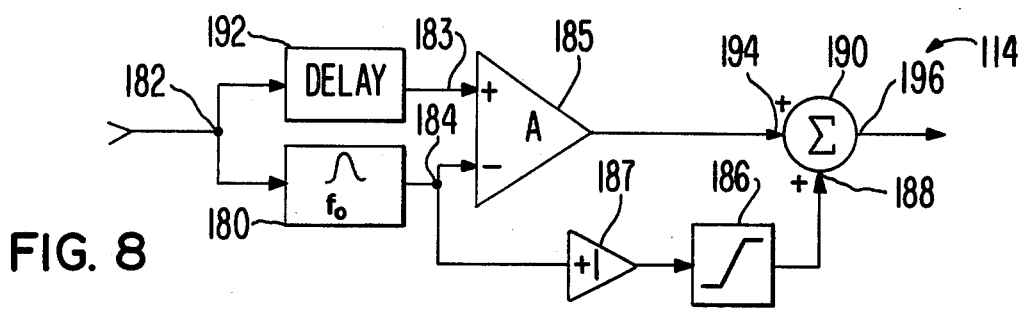
FIG. 8
|  | I | II |
|---|---|---|
| FIG. 9A<br>JUNCTION 182 | 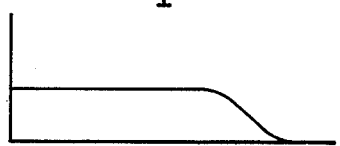 | 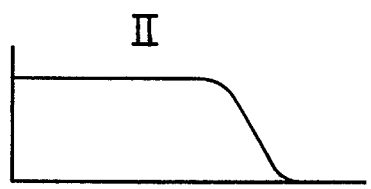 |
| FIG. 9B<br>JUNCTION 184 | 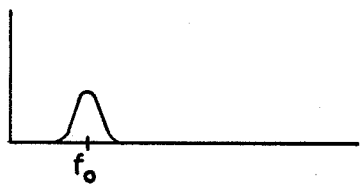 | 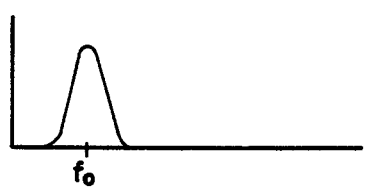 |
| FIG. 9C<br>INPUT 194 | 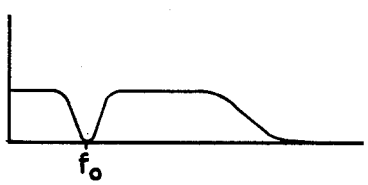 | 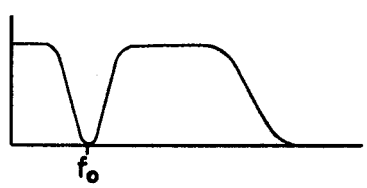 |
| FIG. 9D<br>INPUT 188 | 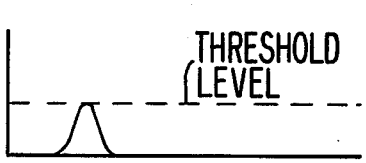 | 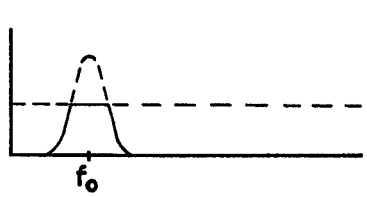 |
| FIG. 9E<br>OUTPUT 196 | 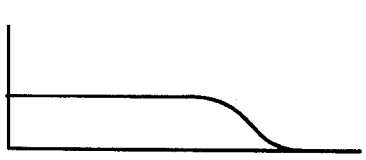 | 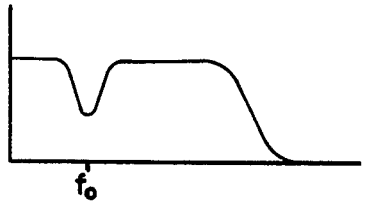 |

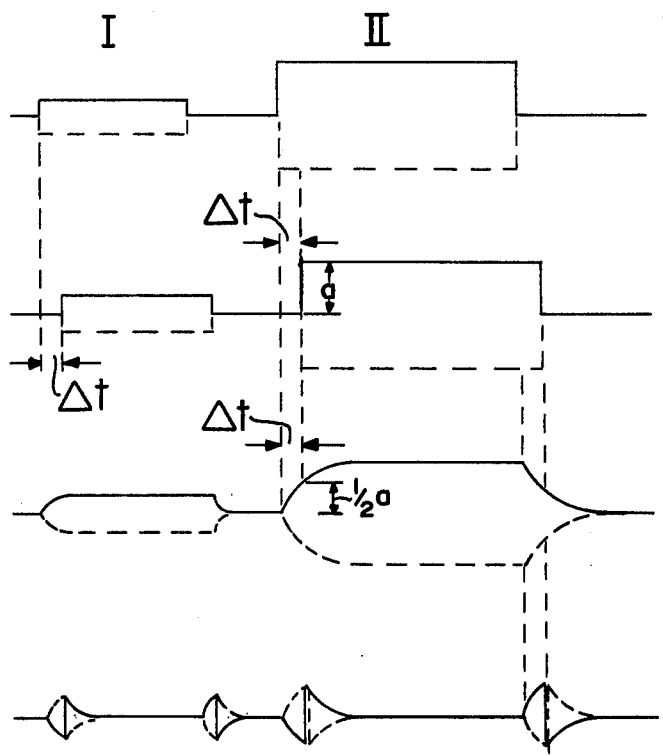
FIG. 10A INPUT 182
FIG. 10B 183
FIG. 10C 184
FIG. 10D 183−184=194
FIG. 10E 188
FIG. 10F 188+194=196
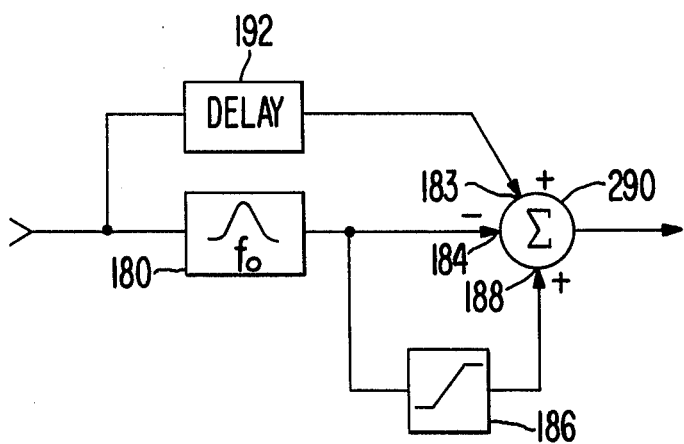
FIG. 11

COLOR TELEVISION ENCODER SIGNALS

BACKGROUND OF THE INVENTION

1. Field of the Invention

This invention relates to an improvement of the modulated output signal of a color television signal encoder. In particular, the invention is useful to phase synchronize a frequency modulated subcarrier and a modulating signal and further to inhibit modulated signal crosstalk between the simultaneously transmitted luminance and chrominance signals of a frequency modulated carrier. This improvement is particularly applicable to color television systems operative according to the SECAM standard developed in France.

In order to appreciate the problems solved by the present invention, it is helpful to understand basic principles of operation of the principal color television standards, NTSC (United States), PAL (Western Germany) which are phase quadrature am standards, and SECAM, which is a sequential fm standard. Inasmuch as the preferred application of the present invention is used in a frequency modulated carrier system, the invention is described in the context of the SECAM standard. Where the invention is applicable in the systems of other standards, relevant operational characteristics are explained.

A color television signal comprises "luminance" (brightness) and "chrominance" (hue) information which must be encoded in such a manner as to be decodable in both compatable wideband black and white and color receivers. SECAM, an acronym for "sequential color and memory", is a color television encoding standard wherein a composite of chrominance information and luminance information is provided in frequency modulated form. The composite signal comprises: (1), in one frequency band, a frequency moudlated luminance signal equal to the sum of the weighted intensity values of the three primary hues, red, green and blue, and (2), in an adjacent, partially overlapping frequency band, sequentially alternating frequency modulated chrominance signals containing information consisting of the differences between the intensities of two primary hue values, red and blue, and the corresponding luminance signal. As sequential chrominance transmission is utilized, as opposed to simultaneous chrominance transmission, two lines are generally required to provide the signal information of a complete scan line image. As a result, a color memory device is necessary in the decoder (at the receiving end). The color memory device typically comprises a delay line.

2. Description of the Prior Art

In the past, certain parameter restrictions imposed by the SECAM standard have been extremely difficult to satisfy. Prior art signal encoders (at the transmitting end) are not always able to provide a sufficiently unambiguous signal to the receiver and signal decoders for reproducing reliably accurate television images.

For example, the SECAM standard dictates that the center frequency of the luminance signal and the center frequency of the sequential chrominance signals be exact harmonics of the horizontal line scan frequency. Furthermore, the standard requires absolute phase coincidence between the line scan frequency and the modulated chrominance signals at the beginning of each alternating line scan.

Prior art SECAM encoders, particularly encoders sold by MATRA of France (Model M380R) and by the French consortium, Thompson-CSF (Model TTV4630), have addressed the problem of satisfying the SECAM standard with marginal success. These encoders have adopted the use of a single sub-carrier modulator in conjunction with a master switching device. According to the prior art technique, the modulated chrominance signals are alternately switched and locked to the master oscillator via the master switching device at the end of each scanned line (e.g., during the blanking period).

A major problem exists with this technique in that it is extremely difficult to achieve absolute phase coherence between the master oscillator and the switched modulated chrominance signals, since so little time is provided for phase locking. In particular, the prior art single modulator/oscillator system permits phase locking only during the line blanking periods, which may be as short as 10 or 12 cycles at the sub-carrier frequency, which is typically about 4 MHz. Thus, only about 2.5 microseconds is provided for phase locking. Prior art encoders operative according to this single-oscillator/modulator technique typically require additional circuitry or special components to assure proper operation. As one example, temperature compensated high precision components may generally be required.

Another problem associated with the SECAM standard is the interference between luminance and chrominance information under certain signal conditions, which may cause receiver error in the receiver decoding circuitry. This phenomenon is generally known as crosstalk, and it is a particular characteristic of frequency modulated signals transmitted in closely adjacent or overlapping frequency bands. The phenomenon of crosstalk occurs when the transmitted video signal comprises a closely spaced repetitive pattern of large signal variations, such as a herringbone or picket fence. (Hence, the crosstalk phenomenon is often called the "picket fence" effect). Crosstalk is evidenced in the receiver when repetitive bursts of luminance information signals "capture" the chrominance decoding circuitry of the television receiver. This results in the acceptance by the receiver of luminance information as chrominance information, scrambling the received image.

In order to prevent frequency-modulated luminance signal interference with the chrominance information of the transmitted signal, an anti-crosstalk trap is included in the luminance channel. The anti-crosstalk traps used in practice in prior art encoders comprise a band reject or notch filter centered at the frequency of potential interference with chrominance information. The notch filter is coupled in parallel with an exactly complementary bandpass filter. In addition, a "clipping" or amplitude limiting circuit is coupled in series with the bandpass filter. The parallel outputs of the complementary filters in the luminance channel are typically recombined in an appropriate summing device. At low signal levels the complementary filters supposedly provide complementary signal cancellation resulting in an undistorted output signal. The trap is supposedly only activated and effective in modifying the luminance signal when the potentially interfering luminance information is of sufficiently high amplitude and duration to operate outside of a preselected clipping range, thereby warranting suppression. However ideal the theory of operation, in practice it is extremely difficult to attain truly complementary bandpass and band reject filters. As a result, undesired distortion may disturb the luminance signal channel over the entire spectrum of modulation.

One proposed improvement in the typical prior art anti-crosstalk trap, reported by R. Fessard of the Television Company of France, provides a band reject circuit which is activated by a voltage controlled resistor (FET) only if the luminance input signal level exceeds a preselected threshold. Such a circuit apparently does not require exact matching between the receiver bandpass and the encoder band reject network. In practice, such a circuit is difficult to implement, since for example practical difficulties are encountered in providing a uniform, reproducible threshold as a function of the luminance signal level.

SUMMARY OF THE INVENTION

In a sequential frequency modulated video signal, such as a color television signal according to the French SECAM standard, phase coincidence between the subcarrier and the modulating signal at the beginning of each sequentially alternating scan line is achieved by alternately keying parallel phase locked loop signal modulators. This permits a first keyed phase locked loop to synchronize to the phase of the first chrominance signal subcarrier during the scan line idling period, while a second, previously synchronized phase locked loop, modulates the second chrominance signal subcarrier. Each modulator is phase synchronized with an independent reference oscillator.

Improved luminance signal encoding, minimizing crosstalk with adjacent chrominance signal channels, is achieved by selected filtering and threshold control in response to repetitive high luminance signal level conditions, such as caused by "picket fence" like images.

Luminance signal encoding circuitry includes an anti-crosstalk trap comprising a "bell" bandpass filter network and signal delimiting element, such as a "clipping" network or a "coring" network, and a signal delay element coupled in a parallel channel to provide a dual signal path. Under repetitive high luminance signal level conditions, the signal threshold element causes the trap to operate in a band reject mode, preventing fm luminance signal capture of chrominance signal receiver circuitry. Phase delay and phase reversal at the leading and trailing edges of signal bursts minimize image distortion and produce a visually improve image with symmetrical edge definition.

The anti-crosstalk techniques and circuitry herein described are particularly useful in fm systems, but are also useful to inhibit crosstalk and to improve image definition in phase quadrature amplitude modulated systems, such as systems operative according to the NTSC or the PAL standard.

An encoder constructed according to the present invention has a number of advantages over prior art encoders. For example, use of dual modulators permits the use of simpler auxiliary circuitry and less expensive circuit components. Moreover, the anti-crosstalk trap may be embodied in a manner which utilizes and cooperates with circuit elements already required in a AECAM-type network, thereby minimizing the number of circuit parts. For example, the anti-crosstalk trap may take advantage of the time delay built into the system and may utilize signal summing circuitry in common with other system functions.

These and other advantages are described in the following detailed description of preferred embodiments.

BRIEF DESCRIPTION OF THE DRAWINGS

The invention may be more completely understood by reference to the following detailed description in conjunction with the accompanying drawings in which:

FIG. 3 is a graphical representation of modulation level versus time for selected chrominance signals;

FIG. 4 is a first preferred embodiment of an anti-crosstalk trap network according to the present invention;

FIGS. 5A–5E and 6A–6G depict and amplitude versus frequency spectrum for signals of selected levels at selected points within the network of FIG. 4;

FIGS. 7 is a schematic diagram of a network having the topology of FIG. 4;

FIG. 8 is a second preferred embodiment of an anti-crosstalk trap network according to the present invention;

FIGS. 9A–9E depict an amplitude versus frequency spectrum for signals of selected levels at selected points within the network of FIG. 8;

FIGS. 10A–10F depicts the amplitude envelope versus time for signals of selected levels at selected points within the network of FIG. 8; and FIG. 11 is a further embodiment of the inventive anti-crosstalk network.

DETAILED DESCRIPTION OF PREFERRED EMBODIMENTS

Figure 1:
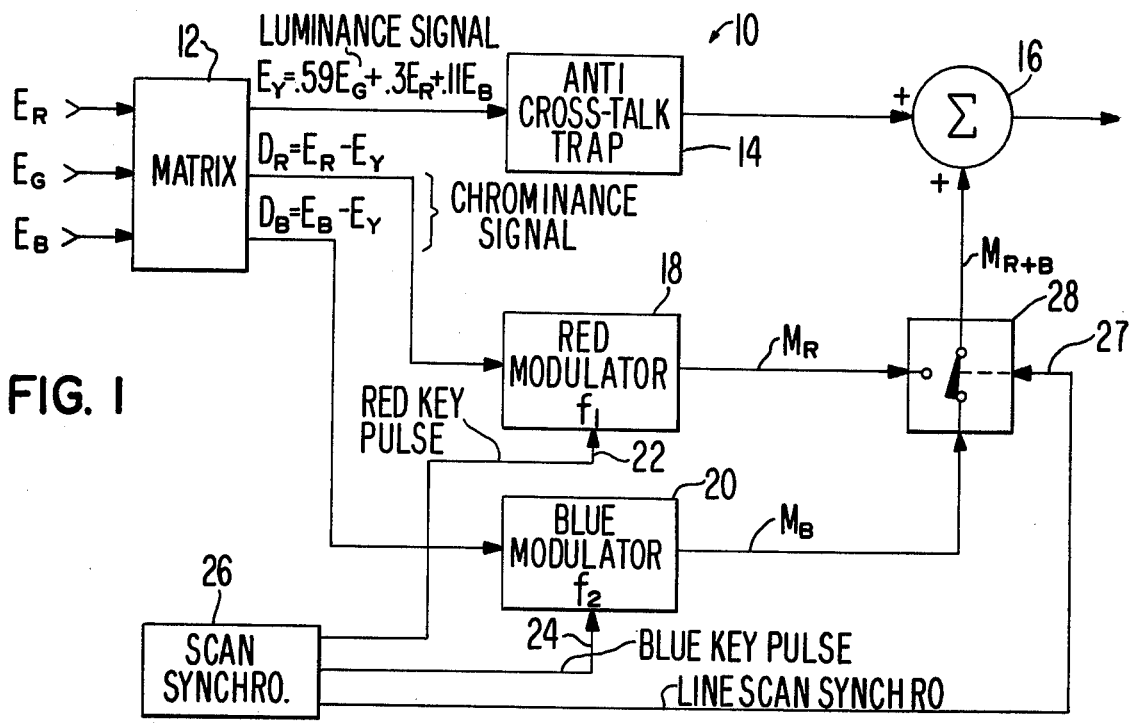
FIG. 1 is a block diagram of an improved signal encoder which may be operative according to the SECAM standard.

An improved television signal encoder 10 operative according to the present invention is illustrated in block diagram form in FIG. 1. The encoder 10 network basically comprises a matrix 12 for processing three color signals, $E_R$(red), $E_G$(green), and $E_b$(blue) received from a tri-color camera source into a luminance signal $E_Y$ and two alternating sequential chrominance signals $D_R$ and $D_B$. The matrix output luminance signal is specified in the SECAM standard by the expression:

$$E_Y = 0.59\, E_G + 0.3\, E_R + 0.11\, E_B.$$

The matrix output chrominance signals are defined by the expressions:

$$D_R = E_R - E_Y$$

and $$D_B = E_B - E_Y$$

where $D_R$ is the red chrominance signal and $D_B$ is the blue chrominance signal.

As explained hereinafter, the luminance signal $E_Y$ is processed through an anti-crosstalk trap 14, the output of which is provided to a signal summer 16.

According to the present invention, each chrominance signal $D_R$ and $D_B$ is provided to parallel independently operative modulators, the red chrominance signal to a first modulator 18 and the blue chrominance signal to a second modulator 20. Each modulator is operative at a predetermined subcarrier frequency, typically at the 272nd and the 282nd harmonics of the video horizontal line scan frequency. The respective subcarriers $f_1$ and $f_2$ are modulated by the chrominance signals in response to alternating key pulse signals operative synchronous to the horizontal line scan. The key pulse signals are provided to the modulators 18 and 20 via key signal paths 22 and 24 from a scan synchronization controller 26.

Outputs of the modulators 18 and 20 are provided to an electronic switch 28, which is operative synchronously with the modulators 18 and 20 under the control of the scan synchronization controller 26 via signal path 27. The electronic switch 28 is operative to time multiplex the modulated blue chrominance signal $M_R$ and red chrominance signal $M_B$ into a composite signal $M_{R+B}$. The output of the switch 28 is provided to the summer 16. The combined frequency and time multiplexed luminance and chrominance output signal of the summer 16 may thereafter be conveyed to a color video receiver for decoding and reception.

Figure 2:
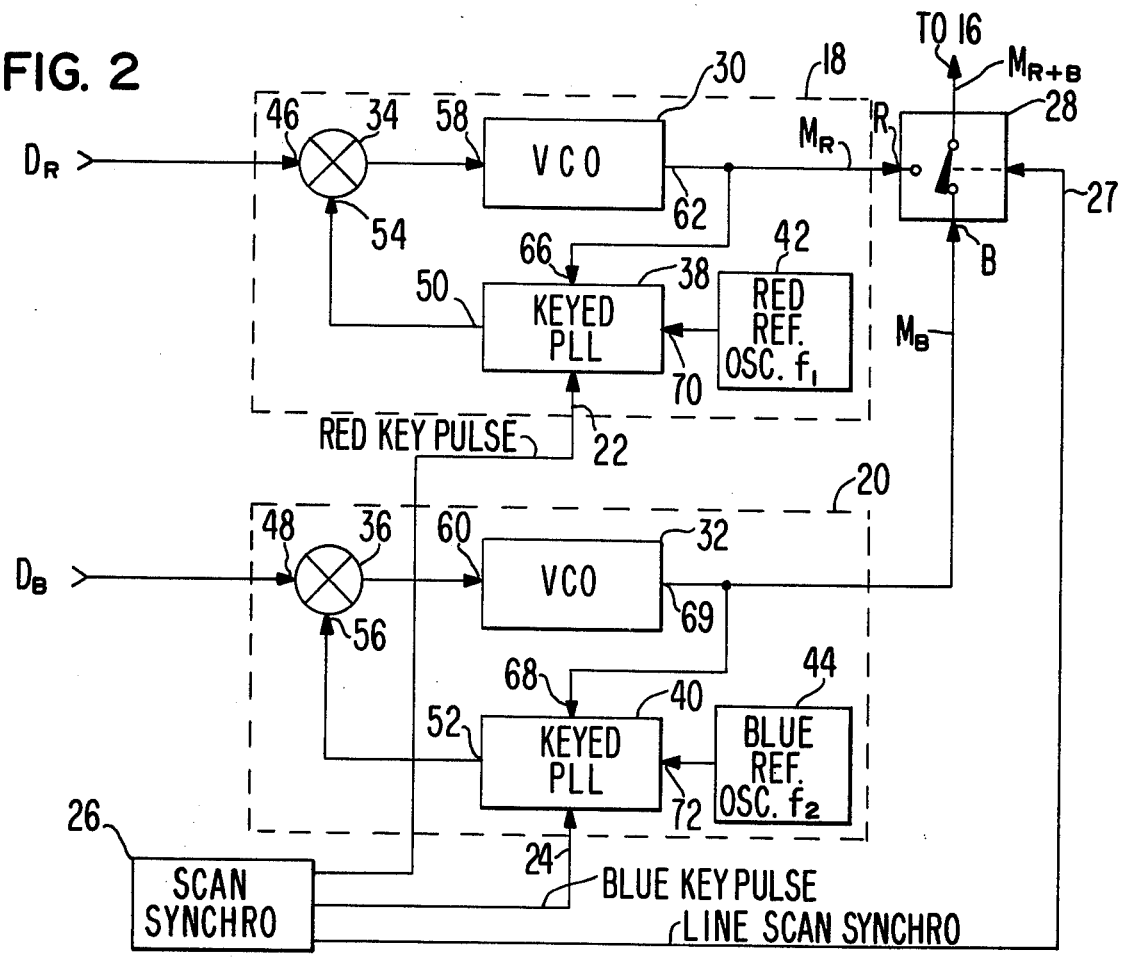
FIG. 2 is a block diagram of the dual parallel modulators and related circuit elements of FIG. 1.

Referring now to FIG. 2, each modulator comprises a voltage controlled oscillator (VCO) 30 and 32, a multiplier 34 and 36, a keyed phase locked loop (keyed PLL) 38 and 40, and a reference oscillator. The first modulator 18, for processing the red chrominance signal $D_R$, includes a "red" reference oscillator 42 providing a reference for the subcarrier frequency $f_1$. Similarly, the second modulator 20 includes a "blue" reference oscillator 44 providing a reference for the subcarrier frequency $f_2$.

Each modulator is of substantially identical topology. The chrominance outputs of the matrix 12 providing the chrominance signals $D_R$ and $D_B$ are coupled to first inputs 46 and 48 of each of the multipliers 34 and 36 respectively. The signal level outputs 50 and 52 of the keyed PLLs 38 and 40 are coupled to second inputs 54 and 56 of the multipliers 34 and 36 respectively. The multiplier outputs are conveyed to two signal level inputs 58 and 60 of the respective VCOs 30 and 32. The variable frequency outputs 62 and 64 of the respective VCOs 30 and 32 are respectively coupled to a first terminal R and a second terminal B of the switch 28, and also to first frequency inputs 66 and 68 of the respective keyed PLLs 38 and 40. The reference oscillators 42 and 44 are coupled to second frequency inputs 70 and 72 respectively. "Red" and "blue" key pulse signals from the controller 26 for controlling the operation of the respective keyed PLLs 38 and 40 are provided via the key signal paths 22 and 24. The signal path 27 is operative to provide horizontal line scan synchronization of the switch 28.

FIG. 3 is useful for understanding the operation of a circuit according to FIG. 2. FIG. 3 is a graphical representation of modulation level versus time of signals $M_R$, $M_B$ and $M_{R+B}$ at the inputs R and B and the output of the switch 28.

In circuit operation, during the "red" modulation idle period $t_1$ (FIG. 3, $M_A$). The keyed PLL 38 (FIG. 2) of the red modulator 18 synchronously locks the output frequency of the VCO 30 to the reference subcarrier frequency $f_1$ of the red reference oscillator 42. During the blanking period $t_2$, the keyed PLL 38 is commanded, via line 22, to couple the output 50 of the keyed PLL 38 to the multiplier 34, completing the feedback loop of the VCO 30. During the modulation period $t_3$, the modulating signal $D_R$ modulates the subcarrier to produce a modulated output signal $M_R$ synchronous with the phase of the output of the reference oscillator 42. The phase of the reference oscillator 42 may be suitably synchronized to the phase of a harmonic of the horizontal line scan frequency, for example, through the use of a further phase locking scheme (not shown) involving the oscillators 42 and 44 and the controller 26. At the termination of the modulation of the scanned line, the keyed PLL 38 is electronically decoupled from the multiplier 34 and the above described subcarrier synchronization and modulation cycle repeats.

Similarly, during the relatively long "blue" modulation idle period $t_3$ (FIG. 3, $M_B$), the second keyed PLL 40 synchronously locks the output frequency of the second VCO 32 to the reference subcarrier frequency $f_2$ from the "blue" reference oscillator 44. During the subsequent blanking period $t_4$, the second keyed PLL 40 couples the output 52 to the multiplier 36, thereby completing the feedback loop of the VCO 32. The modulating signal $D_B$ synchronously modulates the subcarrier $f_2$ during the period $t_1$, producing the modulated signal $M_B$.

The modulated signals $M_R$ and $M_B$ are provided to the electronic switch 28 which, upon command via signal path 27, produces a time multiplexed chrominance output signal $M_{R+B}$ (FIG. 3) suitable for transmission.

Synchronization control provided by the scan synchronization controller 26, is generally in the form of voltage pulses at a selected frequency. For example, a pulse train via paths 22 and 24 (FIG. 2) may be provided at one half the frequency of a pulse train command signal provided via path 27, while the command signal via path 27 may be provided at one half the horizontal line scan frequency. Modulated output signals so produced at the required frequencies readily comply with SECAM standards and are suitable for decoding in a typical SECAM standard receiver.

FIGS. 4, 8, and 11 represent in block diagram form alternative preferred embodiments of the anti-crosstalk trap 14 in the luminance channel of the encoder 10 (FIG. 1). Each embodiment is operative to suppress signals within a preselected band of the frequency spectrum which exceed a preselected threshold level. Suppression is effected by selected filtering and threshold control in parallel signal paths. The circuitry is particularly responsive to repetitive high level luminance signals. Each embodiment comprises a single bandpass filter tuned to a frequency centered at the frequency of potential interference of luminance information in the chrominance channel of a compatible receiver, and a delimiting network which suppresses the effect of filter operation delimited at a preselected threshold level. In the preferred embodiments herein described the signal processing results in a number of instantaneous phase reversals and amplitude level limiting which inhibit capture of the chrominance circuitry by the luminance signals.

Referring first to FIG. 4 (FIGS. 8 and 11 will be explained hereinafter), there is shown an anti-crosstalk trap 14. The tap 14 includes a bandpass filter network 80, which is generally a "bell" filter network centered at a passband frequency of $f_o$. The filter network 80 receives signal input from a junction 82 and provides an output signal through a signal path 84, which is coupled to the input of a coring network 86. The coring network 86 is operative to inhibit the transmission of signals below a preselected level. The output of the coring network 86 is coupled to a first summing input 88 of a summing network 90.

From the junction 82, a signal path is provided to a delay network 92. The delay network 92 is coupled to a second summing input 94 of the summing network 90.

Output of the summing network 90 is provided at an output terminal 96. The output signal is selected to be the arithmetic difference of the signals provided at the input 88 and at the input 94.

The delay network 92, which may be a length of transmission line or the like, is operative to introduce a preselected period of delay into the input signal without distortion. At the bandpass frequency $f_o$, this delay is preferably the period required of a step signal through the filter network 80 to reach approximately one-half of the signal's steady state value. (Alternatively, the delay network 92 may include an additional period delay factor equal to 180 degrees at the bandpass frequency $f_o$. The summing network 90 may be suitably modified to produce an arithmetic sum of signals received at the inputs 88 and 94. Thus, the delay network 92 may produce a signal at the input 94 which is 180 degrees out of phase with signals provided at the input 88, thereby effectively producing a difference signal.)

An anti-crosstalk network according to the above embodiment is operative to pass all signals provided at the input junction 82, delayed through the delay network 92, with the exception of signals within the passband $f_o$ of the filter network 80 which exceed the preselected threshold level of the coring circuit 86. FIG. 5, which depicts an amplitude vs. frequency spectrum of an input signal below the threshold (in Column I) and above the threshold (in Column II), and FIG. 6, which depicts amplitude vs. time for typical input signal bursts are useful for illustrating the network operation.

In FIG. 5, graph I(A) depicts the spectrum of an input signal at junction 82 of FIG. 4 for a signal below the threshold. Graph II(A) depicts a typical higher level input signal. At I(B) and II(B), the output characteristic of the filter 80 (signal path 84) are depicted for the input signals of I(A) and II(A) respectively. Graphs I(C) and II(C) depict signals at the second summing input 94. Graphs I(D) and II(D) depict typical signals at the first summing input 88. As can be seen, the zero signal level is offset by the amount of the threshold level. Thus, only signals exceeding the threshold level, as in II(D), appear at the summing input 88. Graphs I(E) and II(E) depict the desired output characteristic at the output terminal 96. The characteristic represents the difference between the signals provided at summing inputs 88 and 94. As shown in I(E), the characteristic is suppressed at the frequency $f_o$ to the threshold level (shown in phantom).

FIG. 6 depicts graphically the amplitude envelope versus time diagrams for an input signal burst below the threshold level (in Column I) and above the threshold level (in Column II). A repetitive train of signals such as shown in FIG. 6(A)II cause the undesired crosstalk, which the present invention minimizes as explained hereinbelow. Phase relative to a common reference is indicated by complementary bold face and phantom lines. For example, the peak amplitude excursions relative to zero degrees phase are outlined with solid lines, while peak amplitude excursions relative to 180 degrees phase are outlined in phantom. It should be noted that signal representations are not to scale. FIG. 6(A) depicts typical luminance input signals bursts into the network at junction 82. The inventive network at junction is most useful where high level signal bursts, such as depicted in Column II occur in a repetitive train. A typical receiver can tolerate a limited number of such large signal bursts without succumbing to crosstalk interference in the receiver chrominance network, since the interfering luminance sideband signals are initially of such low energy content that a period of time is required before the receiver begins to track the luminance subcarrier.

In FIG. 6(B), the signal at the second summing junction 94 is depicted. The signal is delayed by an amount $\Delta t$ as a result of the delay network 92. The maximum burst amplitude (a) is so indicated in Column II.

FIG. 6(C) depicts signals occurring at the first summing junction 88. Signals below the threshold level (*l*) are blocked by the coring network 86, as indicated by the zero signal in Column I. In Column II, the envelope of a high level signal burst is depicted. The leading and trailing edges of the signal envelope are modified according to the time domain characteristics of the filter network 80.

The time constant of the filter network 80 and the delay time of the delay network 92 may preferably be selected so that the commencement of the delayed signal B coincides with the time when the filtered signal (at input 88) reaches 50% of its maximum value ($\Delta t'$). In selecting the time constant of the filter network 80. The principal constraint is that the selectivity (or Q) of the filter 80 be less than or equal to the selectivity of the intended receiver. This constraint assures that the receiver luminance circuitry performance is not degraded by potential interference from crosstalk signals in the sidebands of the filter network 80. It is also preferable that the group delay be selected to correspond to a whole or half wavelength period of the filter 80 at its center frequency, as explained hereinafter with reference to the summing network.

Referring now to FIG. 6(D), which depicts the output of the anti-crosstalk network at output terminal 96, Column I illustrates the low level output signal and Column II illustrates the resultant high level output signal. The signal of FIG. 6(D)II is of particular interest for illustrating the intended operation of the inventive network. In circuit operation, the input signal (FIG. 6(A)II) causes the filtered signal (FIG. 6(C)I) to begin an exponential rise. Onset of a rise in the signal at junction 88 will be delayed until the filtered signal exceeds the threshold level of the coring network 86. Thereafter, after a time interval $\Delta t'$, the delayed signal (FIG. 6(B)II) abruptly increases to its maximum value. Since the signals at inputs 88 and 94 are out of phase, an abrupt phase reversal occurs at point P, and the composite signal decays exponentially thereafter, to the level *l*, determined by the threshold level.

At the termination of the input burst, a similar process occurs. The output signal (FIG. 6(D)II) increases slightly until the delayed signal (FIG. 6(B)II) terminates. A sudden phase reversal occurs at this termination point, and the signal decays rapidly to zero.

Several advantages result from a luminance signal processed as hereinbefore described. First, the main body of the luminance signal envelope is approximately symmetric with respect to the leading and trailing edges of the signal. Thus, a color image will appear to have symmetrically defined side edges. Moreover, the effect of the symmetry as viewed on a wideband black and white receiver is acceptably pleasing. In a wideband black and white receiver, the trap effect causes symmetrically distribution of superimposed a.c. information on a d.c. envelope. FIG. 6(E) illustrates the effect (The a.c. undulations are not to scale.).

As a further advantage, as a result of the time delay and selected phase reversals, the peak amplitude of the processed luminance signal at the frequency $f_o$ which exceeds the threshold level is only one-half of the peak amplitude of the unprocessed high level luminance signal. Thus, the energy content of luminance signal sidebands is further reduced. At lower input signal levels the trap network has no effect, since the signal is blocked by the coring network 86. Still further, the frequency content of the processed signal is unaffected. And as a still further advantage, the threshold level may be established precisely and repeatably with relatively simple circuit elements.

FIGS. 6(F)I and II illustrate the effect of the resultant encoder luminance signal in the chrominance channel of a color receiver. As a result of the tuned network in the front end of the typical receiver, the signal build up at the leading edge and tail off at the trailing edge of each signal burst is somewhat lengthened. This proves to be an advantage, since the receiver is capable of tolerating lengthened periods of luminance signal interference without succumbing to the characteristic crosstalk capture. Furthermore, the receiver appears to be less susceptable to other forms of interference, such as luminance bursts at leading and trailing edges and noise in the channel.

The anti-crosstalk trap of the present invention may be implemented with either a coring network or a clipping network. FIG. 7 illustrates schematically a suitable circuit according to the embodiment of FIG. 4. The coring network for example may comprise a pair of diodes D1 and D2 coupled antiparallel to a grounded load resistor R to define a non-linear voltage transfer function having the desired transfer characteristic. Similarly, the bandpass network 80 may comprise a simple L-C tank circuit. The summing network 90 may be of standard linear circuit design and may include additional input terminals (shown in phantom) for other signals such as the chrominance signals which must otherwise be subsequently added. This represents an economy of circuit elements.

The inventive anti-crosstalk trap 14 takes advantage of a still further economy of circuit elements. For example, a delay network has been necessary in the luminance channel of prior art encoders in order to correct for a group delay in the encoder chrominance signal channel resulting from required filtering. A typical chrominance signal envelope is depicted in FIG. 6(G). In the present invention, the delay network 92 provides this function. Furthermore, the delay is preferably selected to produce a luminance output signal symmetric with the envelope of the chrominance signals. As a result the anti-crosstalk trap according to the present invention may require as few as two additional network elements for practical implementation; namely, a filter network (80) and a coring network (86).

The inventive network may be implemented in still other topologies. For example, the threshold function may be provided by a clipping network. FIG. 8 illustrates, in block diagram form, an anti-crosstalk trap 114 which utilizes a clipping network 186. In this embodiment, a filter network 180 centered at the frequency $f_o$ is coupled between the input at a junction 182 and the inverting input (−) of a differential amplifier 185 via a junction 184. The junction 184 is coupled to the clipping network 186, preferably through an isolation amplifier 187. The clipping network 186 is coupled at a first non-inverting summing input 188 to a summing network 190. A delay network 192 is coupled between the input junction 182 and the non-inverting input (+) of the differential amplifier 185 via a signal path 183. The output of the differential amplifier 185 is coupled to a second noninverting summing junction 194 of the summing network 190. The output of the trap 114 is provided at the summer output terminal designated 196.

FIG. 9 illustrates graphically the amplitude versus frequency characteristic of the network of FIG. 8 for a low level and a high level input signal (in Columns I and II respectively). The signal characteristics are illustrated at the designated circuit points 182, 184, 194, 188 and 196. It should be noted that the output spectrum at output 196 is identical to the output spectrum of terminal 96 shown in FIG. 5.

FIG. 10 illustrates the amplitude envelope verses time characteristic of the network of FIG. 8 for a low level and a high level input signal. The signal characteristics are illustrated at the circuit points 182, 183, 184, 194, 188 and 196. At point 183 the signals are shown delayed by a time period $\Delta t$. At point 184 the input signals are shown (exaggerated) as modified by the characteristics of the filter network 180. The time $\Delta t$ is preferably chosen to coincide with the half amplitude point of the waveform at 184. At point 194, the output of the differential amplifier 185, the typical processed difference signals are shown. The signals are zero except that near the leading and trailing edges of each burst, the effects of the time delay and of the filter characteristic cause spikes to occur. A phase reversal during the spikes is indicated by the crossover of the solid and the phantom lines.

At point 188 the characteristic and effect of the clipping network are shown. At point 196, the output characteristic is shown. It is to be noted that the onset of the burst is delayed by a period $\Delta t$ as a result of signal cancellation.

In operation only the leading edge of a large signal burst exceeds the threshold level at the network output. A large signal burst decays quickly to the threshold level thereafter. At such a trailing edge, a phase reversal occurs. In a receiver, the trailing edge phase reversal has a "fly wheel" effect, which causes the signal in the receiver circuitry to collapse much more quickly than is suggested by the envelope of the transmitted signal.

The embodiment of FIG. 8 may be further refined as indicated in FIG. 11. In this embodiment, the function of the differential amplifier 185 (FIG. 8) is incorporated into a summing network 290 (FIG. 11). The output of the filter 180 (FIG. 11) is provided to an inverting input 184 of the summing network 290 as well as to the clipping network 186. (Signal isolation may be provided as required). The output of the delay network 192 is likewise provided to a noninverting input 183 of the summing network 290. The operating characteristics of the embodiment of FIG. 11 are identical to the operating characteristics of the embodiment of FIG. 8.

A method underlies the above described techniques for minimizing luminance crosstalk in a receiver chrominance signal circuit. The method comprises providing an input signal representative of luminance information to a first signal channel and to a second signal channel, filtering the signal in the first signal channel establishing a passband spectrum, providing threshold limits on the excursion of filtered signals in the first signal channel, delaying the input signal a predetermined period in the second signal channel (without disturbing the frequency characteristics thereof), and combining additively the signals in the first signal channel and in the second signal channel to define a frequency spectrum and an amplitude versus time characteristic minimizing interference with chrominance information received by a compatible color television receiver. In particular, the combining step comprises additively combining signals of the first channel and signals of the second channel so as to produce differential output signals defining a rejection band in the output frequency spectrum for input signals above the preselected threshold level and within the passband spectrum.

In one specific embodiment, input signal representations of luminance information are provided to a first signal channel and to a second signal channel. The signals in the first channel are filtered by a bandpass filter, preferably having a bell shaped characteristic, and then are cored such that all signals below a preselected amplitude threshold are suppressed. Signals exceeding the preselected threshold are provided to a summing network. The signals in the second channel are delayed by a preselected period. The period is preferably equal to the period required of signals through the first channel to attain one-half of steady state amplitude. The delayed second channel signals are thereupon provided to the summing network wherein output signals having the desired output characteristics are generated as a difference between the first channel signals and second channel signals. The output signals may be established by providing the first and second channel signals to the summing network inverted with respect to one another, i.e., 180° out of phase, such that complementary signals exactly cancel.

In a further specific embodiment, input signal representations of luminance information are provided to a first signal channel and to a second signal channel. The signals in the first channel are filtered by a bandpass filter. The filtered signals are provided to a first subchannel and to a second subchannel. The signals in the first subchannel are clipped suppressing signals excursions above a preselected threshold. Signals in the second channel are delayed by a preselected perod. The period is preferably equal to the period required of signals through the first channel to attain one-half of steady state amplitude. Thereafter, the delayed signals are combined with the signals in the second subchannel to establsih difference signals. The difference signals and the clipped signals are combined additively such that the first channel (delayed) signals are in phase with the clipped signals, thereby generating output signals of the desired characteristics.

A principal purpose of the time delay herein described is to control the leading edges and the trailing edges of the signal amplitude envelope. In some applications it may be suitable to eliminate the time delay, as for example, in non-SECAM systems.

In particular embodiments of anti-crosstalk traps herein described are well suited to fm color television systems such as those operative according to the SECAM standard, where crosstalk has been found to be particularly troublesome. The circuit embodiments herein described may also be utilized in the luminance channel of PAL- and NTSC-standard color television systems. Such systems are generally quadrature amplitude modulated, i.e., wherein two amplitude modulated signals at a quadrature phase angle to one another are transmitted simultaneously. As such, crosstalk is much less of a problem. However, such prior art systems have sometimes employed some form of frequency band reject filtering in the luminance channel to reduce crosstalk. Many of the prior art schemes are found to be unsatisfactory because of a characteristic "ringing" or transient oscillation introduced into the luminance signal by the band rejection filtering scheme.

An anti-crosstalk network according to the present invention has been found to be effective as the luminance filter network in NTSC and PAL systems. The inventive network inhibits the picket fence effect, present also to some extent in a.m. systems.

The present invention relating to improving color television encoder signals has been described with reference to specific embodiments in context of particular applications. It is not intended that the invention be limited except as indicated by the appended claims.

What is claimed is:

1. A chrominance modulation system for generating a composite time-multiplexed chrominance signal of a color television encoder comprising:
   a first modulator means for modulating a first chrominance signal during first time periods;
   a second modulator means for modulating a second chrominance signal during second time periods;
   a first oscillator providing a first reference signal at a first subcarrier frequency;
   a second oscillator providing a second reference signal at a second subcarrier frequency differing from said first subcarrier frequency;
   means coupled to said first modulator means and to said second modulator means for alternately switching said first and second chrominance signals to generate a common time-multiplexed composite chrominance signal;
   means for phase synchronizing said first modulator with said first reference signal during said second time period; and
   means for phase synchronizing said second modulator with said second reference signal during said first time periods.

2. A chrominance modulation system according to claim 1, wherein said system includes a master control signal means and wherein said first and second modulator means each comprise a phase locked loop network having a modulation signal/subcarrier signal multiplier and a voltage controlled oscillator, said multiplier being operative to convey a signal to said voltage controlled oscillator; and wherein said first and second phase synchronizing means each comprise a keyed phase locked loop network operative to couple and uncouple a signal representative of the output of said voltage controlled oscillator in phase synchronization with said reference signal in response to control signals of said master control signal means to provide a feed-back subcarrier signal to said multiplier which is phase synchronized with said reference signal at selected time intervals.

3. A luminance signal interference suppressing system comprising:
   a first signal channel; a second signal channel; input means adapted to receive signals representative of luminance information and operative to convey said signals to said first channel and to said second channel; bandpass filter means in said first channel adapted to receive said first channel signals and to pass only a preselected frequency spectrum thereof;
   signal thresholding means serially coupled with said filter means and operative to pass only said first channel signals delimited at a preselected signal excursion threshold;

summing means adapted to receive said filtered and delimited first channel signals and said second channel signals and operative to generate luminance output signals representative of the difference between said filtered and delimited first channel signals and signals provided through said second channel; and signal delay means adapted to receive said second channel signals and operative to retard said second channel signals a period substantially equal to the period required of said filtered first channel signals to attain one-half of steady state value.

4. A system according to claim 3, wherein said signal thresholding means comprises:

a coring network operative to delimit by suppressing said first channel signals below said preselected signal excursion threshold.

5. A system according to claim 4, wherein said signal delay means is further operative to retard said second channel signals by a period corresponding to the retardation of the composite signals for producing substantially symmetric composite signals at the video receiver.

6. A system according to claim 4, wherein said signal delay means is further operative to retard said second channel signals such that said filtered and delimited first channel signals are phase inverted with respect to said second channel signals, and wherein said summing means is operative to additively combine received signals for producing a differential output signal.

7. A system according to claim 3, further including means for phase inverting said filtered first channel signals with respect to said second channel signals and for additively combining the respective out-of-phase signals, and wherein said thresholding means comprises a clipping network adapted to receive said filtered first channel signals and operative to delimit by suppressing said filtered first channel signals above and preselected signal excursion threshold, and further wherein said summing network is operative to additively combine said filtered and delimited first channel signals in phase with said delayed second channel signals.

8. A luminance signal interference suppressing system comprising:

a first signal channel;
a second signal channel;
input means adapted to receive signals respresentative of luminance information and operative to convey said signals to said first channel and to said second channel;
bandpass filter means in said first channel adapted to receive said first channel signals and to pass only a preselected frequency spectrum thereof;
signal threshold means serially coupled with said filter means and operative to pass only said first channel signals delimited at a preselected signal excursion threshold, wherein said signal thresholding means comprises a coring network operative to delimit by suppressing said first channel signals below said preselected signal excursion threshold;
summing means adapted to receive said filtered and delimited first channel signals and said second channel signals and operative to generate luminance output signals representative of the difference between said filtered and delimited first channel signals and signals provided through said second channel.

9. A luminance signal interference suppressing system comprising:

a first signal channel;
a second signal channel;
input means adapted to receive signals representative of luminance information and operative to convey said signals to said first channel and to said second channel;
bandpass filter means in said first channel adapted to receive said first channel signals and to pass only a preselected frequency spectrum thereof;
signal thresholding means serially coupled with said filter means and operative to pass only said first channel signals delimited at a preselected signal excursion threshold;
summing means adapted to receive said filtered and delimited first channel signals and said second channel signals and operative to generate luminance output signals representative of the difference between said filtered and delimited first channel signals and signals provided through said second channel; and
means for phase inverting said filtered first channel signals with respect to said second channel signals and for additively combining the respective out of phase signals, and wherein said threshold means comprises a clipping network adapted to receive said filtered first channel signals and operative to delimit by suppressing said filtered first channel signals above said preselected signal excursion threshold, and further wherein said summing network is operative to additively combine said filtered and delimited first channel signals in phase with said second channel signals.

10. A system according to claim 9, wherein said phase inverting means comprises a differential amplifier adapted to receive said filtered first channel signals at an inverting input and said second channel signals at a noninverting input and to provide a difference signal to said summing means.

11. A system according to claim 10, wherein said phase inverting means comprises a differential amplifier adapted to receive said filtered first channel signals at an inverting input and said delayed second channel signals at an noninverting input and to provide a difference signal to said summing means.

12. A method for improving color television encoder output signals comprising the steps of:

providing input signals representative of luminance information to a first signal channel and to a second signal channel;
filtering the signals in said first channel establishing a passband spectrum;
delimiting the excursions of said filtered signals at a preselected threshold level;
combining said filtered and delimited first channel signals with the second channel signals for providing output signals having an output frequency spectrum and an amplitude versus time output characteristic minimizing interference with signals representative of chrominance information provided to a compatible color television receiver; and delaying said second channel signals a predetermined period to said combining step, wherein said delaying step comprises retardeding said second channel signals by a period substantially equal to the period required of said filtered first channel signals to attain one-half of steady state value.

13. A method according to claim 12, wherein said filtering step comprises bandpass filtering according to a bell-shaped characteristic, and wherein said delimiting step comprises coring said first channel signals suppressing all amplitude excursions below said preselected threshold, and wherein said delaying step comprises retarding said second channel signals by a period substantially equal to the period required of said filtered first channel signals to attain one-half of steady state value.

14. A method for improving color television encoder output signals comprising the steps of:
providing input signals representative of luminance information to a first signal channel and to a second signal channel;
filtering the signals in said first channel establishing a passband spectrum;
delimiting the excursions of said filtered signals at a preselected threshold level;
combining said filtered and delimited first channel signals with the second channel signals for providing output siganls having an output frequency spectrum and an amplitude versus time output characteristic minimizing interference with signals representative of chrominance information provided to a compatible color television receiver, wherein the combining step comprises combining additively said filtered and delimited first channel signals with said delayed second channel signals so as to produce differential output signals defining a rejection band in said output frequency spectrum above preselected input signal levels established by said threshold level and said passband spectrum.

15. A method according to claim 14, wherein said filtering step comprises filtering according to a bell-shaped characteristic and providing said filtered first channel signals to a first subchannel and to a second subchannel producing respectively first and second subchannel signals, and wherein said delimiting step comprises clipping said first subchannel signals, thereby suppressing signal amplitude excursions above said preselected threshold, and wherein said combining step comprises additively combining said delayed second channel signals in inverted phase relation with said filtered second subchannel signals an in noninverted phase relation with said filtered and clipped first subchannel signals for providing said output signals.

16. A method according to claim 15, wherein said combining step comprises first combining delayed second channel signals and said filtered second subchannel signals to define difference signals and thereafter combining said difference signals with said filtered and clipped first subchannel signals.

17. A chrominance modulation system for improving an output signal of a color television encoder having a luminance signal channel and at least two chrominance signal channels for providing time-multiplexed chrominance signals, said system comprising:
means for modulating a first chrominance signal;
means for modulating a second chrominance signal;
means coupled to said first and to said second modulating means for time-multiplexing said first and second modulated signals to a composite chrominance signal;
a first oscillator providing a first reference signal at a first subcarrier frequency;
a second oscillator providing a second reference signal at a second subcarrier frequency;
means for phase synchronizing said first modulator with said first reference signal;
means for phase synchronizing said second modulator with said second reference signal;
wherein said system includes a master control signal means and wherein said first and second modulator means each comprise a phase locked loop network having a modulation signal/subcarrier signal multiplier and a voltage controlled oscillator, said multiplier being operative to convey a signal to said voltage controlled oscillator; and wherein said first and second phase synchronizing means each comprise a keyed phase locked loop network operative to couple and uncouple a signal representative of the output of said voltage controlled oscillator in phase synchronization with said reference signal in response to control signals of said master control signal means to provide a feed-back subcarrier signal to said multiplier which is phase synchronized with said reference signal at selected time intervals.

18. Apparatus for generating a video signal according to a SECAM broadcast standard comprising:
means coupled to a tri-color signal source for providing a luminance signal to a luminance output, and a first chrominance signal to a first chrominance output, and a second chrominance signal to a second chrominance output;
an anti-crosstalk trap coupled to said luminance output;
a first keyable modulator coupled to said first chrominance output, said first modulator being operative at a first subcarrier frequency;
a second keyable modulator coupled to second chrominance output, said second modulator being operative at a second subcarrier frequency having a common subharmonic frequency with said first subcarrier frequency;
means coupled to said first modulator and to said second modulator for alternately switching the modulated output signals of said first and said second modulators in synchronization with said common subharmonic frequency to time-multiplex said first and said chrominance signals as a composite chrominance signal; and
means coupled to said switching means and to said anti-crosstalk trap for adding said luminance signal and said composite chrominance signal.

19. An apparatus according to claim 18 wherein said switching means further comprises means for phase synchronizing said first and said second modulated subcarrier frequencies.

20. A method for encoding a tri-color video signal according to a SECAM broadcast standard comprising:
generating a luminance output signal;
generating a first chrominance signal;
generating a second chrominance signal;
modulating said first chrominance signal at a first subcarrier frequency;
modulating said second chrominance signal independently of said first chrominance signal at a second subcarrier frequency having a common subharmonic frequency with said first subcarrier frequency;
alternately switching said first and said second modulated chrominance signals for generating a time-multiplexed composite chrominance signal; and
adding said luminance output signal and said composite chrominance signal for producing an encoder output signal.

21. A method according to claim 20 further including alternately phase synchronizing said first and second chrominance signals with said subcarrier frequencies during alternating idle periods of said switching step.

22. A method for encoding a tri-color video signal according to a SECAM broadcast standard comprising the steps of:

generating a luminance output signal;

generating a first chrominance signal during first periods;

generating a second chrominance signal during second periods alternating with said first period;

modulating said first chrominance signal during said first periods at a first subcarrier frequency;

modulating a second chrominance signal during said second periods and a second subcarrier frequency having a subharmonic frequency in common with said first subcarrier frequency;

phase synchronizing said first subcarrier frequency with said first subharmonic frequency during said second period;

phase synchronizing said second subcarrier frequency with said second subharmonic frequency during said first period;

alternately switching said first and said second modulated chrominance signals for generating a time-multiplex composite chrominance signal; and adding said luminance output signal and said composite chrominance signal for producing an end coded output signal.

* * * * *